US009367949B2

(12) United States Patent
Lee et al.

(10) Patent No.: US 9,367,949 B2
(45) Date of Patent: Jun. 14, 2016

(54) APPARATUS AND METHOD FOR SCHEDULING OF RAY TRACING

(71) Applicant: Samsung Electronics Co., Ltd., Suwon-si, Gyeonggi-do (KR)

(72) Inventors: Won Jong Lee, Seoul (KR); Young Sam Shin, Hwaseong-si (KR); Jae Don Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 13/902,157

(22) Filed: May 24, 2013

(65) Prior Publication Data
US 2014/0078143 A1 Mar. 20, 2014

(30) Foreign Application Priority Data
Sep. 17, 2012 (KR) .................. 10-2012-0102709

(51) Int. Cl.
*G06T 15/06* (2011.01)
(52) U.S. Cl.
CPC ...................... *G06T 15/06* (2013.01)
(58) Field of Classification Search
None
See application file for complete search history.

(56) References Cited

U.S. PATENT DOCUMENTS 7,505,043 B2 * 3/2009 Bourd .................. G06T 1/60 345/418
2008/0024489 A1 1/2008 Shearer
2008/0088622 A1 * 4/2008 Shearer ................ 345/421
2008/0122838 A1 5/2008 Hoover et al.
2009/0106530 A1 * 4/2009 Lauterbach .......... G06T 15/40 712/30
2010/0079451 A1 4/2010 Zhou et al.
2011/0234583 A1 * 9/2011 Bakalash ............. 345/419
2012/0001912 A1 1/2012 Peterson et al.
2012/0069023 A1 3/2012 Hur et al.
2012/0075300 A1 3/2012 Hur et al.

FOREIGN PATENT DOCUMENTS

| KR | 10-2009-0020924 | 2/2009 |
| KR | 10-2009-0064155 | 6/2009 |
| KR | 10-2010-0128337 | 12/2010 |
| KR | 10-2010-0128493 | 12/2010 |
| KR | 10-2012-0019720 | 3/2012 |

OTHER PUBLICATIONS

Paul Arthur Navrátil et al., "Dynamic Ray Scheduling to Improve Ray Coherence and Bandwidth Utilization", Department of Computer Sciences, The University of Texas at Austin, 10 pages.
Matt Pharr et al., "Rendering Complex Scenes with Memory-Coherent Ray Tracing", Computer Science Department, Stanford University, To appear in Proceedings of SIGGRAPH 1997, pp. 1-8.

* cited by examiner

*Primary Examiner* — Kee M Tung
*Assistant Examiner* — Yi Wang
(74) *Attorney, Agent, or Firm* — NSIP Law

(57) ABSTRACT

A graphic processing apparatus and method for processing ray tracing may include a plurality of traversal units to process traversal of a ray. A management unit of the graphics processing apparatus may distribute data of the ray processed by the graphics processing apparatus to the plurality of traversal units. Each of the plurality of traversal units may process ray traversal with respect to a subdivision of the entire space.

21 Claims, 9 Drawing Sheets

APPARATUS AND METHOD FOR SCHEDULING OF RAY TRACING

CROSS-REFERENCE TO RELATED APPLICATIONS

This application claims the priority benefit of Korean Patent Application No. 10-2012-0102709, filed on Sep. 17, 2012, in the Korean Intellectual Property Office, the disclosure of which is incorporated herein by reference.

BACKGROUND

1. Field

One or more embodiments disclosed herein relate to an apparatus and method for graphics processing, and more particularly, to an apparatus and method for processing ray tracing and scheduling of ray tracing operations.

2. Description of the Related Art

Three-dimensional (3D) rendering may refer to an image processing process of synthesizing data of a 3D object into an image that is observed at a given viewpoint of a camera.

As one example of a rendering method, a rasterization method may include generating an image while projecting a 3D object onto a screen may be employed. As another example of a rendering method, a ray tracing method may include generating an image by tracing a path of light incident along a ray that is emitted from a viewpoint of a camera toward each pixel of an image.

Among the above rendering methods, the ray tracing method may generate a high quality image using physical properties of light, for example, reflection, refraction, transmission, and the like. However, a significantly large amount of calculation may be utilized for ray tracing and thus, the ray tracing method may not perform rendering at a high rate.

A traversal of an acceleration structure and an intersection test between a ray and a primitive may be among the most important factors used to determine the ray tracing performance. The traversal of the acceleration structure and the intersection test may be performed up to a few times to tens of times with respect to each of the input rays. A primitive may be a primitive of a scene object, and may be, for example, a triangle.

The acceleration structure may be a spatially divided acceleration structure. The acceleration structure may be a data structure expressed by spatially dividing a scene object to be rendered. A data structure, for example, a grid, a kd-tree, a bounding volume hierarchy (BVH), and the like, may be employed as the acceleration structure.

The above traversal and intersection test may be a process which utilizes at least 70% of the calculation amount and occupies at least 90% of a memory bandwidth for the operations carried out in ray tracing. That is, traversal operations and intersection tests are relatively computationally expensive, take up relatively more bandwidth, are relatively time consuming, and consume more power relative to other operations performed in ray tracing. A unit to perform traversal or an intersection test generally includes a cache. When data required for the traversal or the intersection test is absent within the cache, a long latency may occur while reading the data from an external memory. The latency may also degrade the ray tracing performance.

SUMMARY

The foregoing and/or other aspects are achieved by providing a graphics processing apparatus for processing ray tracing, the apparatus including a plurality of traversal units to process traversal of a ray, and a management unit to distribute data of the ray processed by the graphics processing apparatus to the plurality of traversal units. Each of the plurality of traversal units may process ray traversal with respect to a subdivision of the entire space.

The entire space may be a space in which ray tracing is performed.

A node within a tree acceleration structure used for ray tracing may indicate the subdivision.

The subdivision may be a bounding box.

The plurality of traversal units may share a global stack for traversal of the ray.

Each of the plurality of traversal units may process ray traversal with respect to an area indicated by an allocated fit point in a tree acceleration structure used for ray tracing. The area indicated by the fit point may be a sub-tree of the tree acceleration structure in which a node corresponding to the fit point is a root node.

The fit point may be determined based on the number of primitives corresponding to one or more leaf nodes of the sub-tree and the number of nodes of the sub-tree.

The fit point may be determined based on a size of data associated with the fit point and a size of a cache of a traversal unit associated with the fit point. Each of the plurality of traversal units may include the cache.

Each of the plurality of traversal units may correspond to a sub-tree indicating the subdivision. The sub-tree may be a portion of a tree acceleration structure used for ray tracing.

The management unit may distribute the data of the ray to a traversal unit corresponding to a sub-tree that includes a node visited by the ray, among the plurality of traversal units.

One or more sub-trees may be provided. Each of the one or more sub-trees may not overlap within the tree acceleration structure. Data of a ray that visits a node of a first sub-tree not corresponding to the plurality of traversal units, among the one or more sub-trees, may be stored in a queue.

The management unit may allocate a first traversal unit among the plurality of traversal units to the first sub-tree, and may distributes, to the first traversal unit, the stored data of the ray that visits the node of the first sub-tree.

A second sub-tree among the one or more sub-trees may correspond to two or more traversal units among the plurality of traversal units. The management unit may determine a traversal unit to transfer data of a ray that visits a node of the second sub-tree among the two or more traversal units corresponding to the second sub-tree, based on load balancing.

The graphics processing apparatus may further include one or more intersection test units to process an intersection test of the ray. The ray may be a ray that is traversed within a tree acceleration structure by the plurality of ray traversal units.

An intersection point generated through the intersection test may be maintained for each of the one or more intersection tests. When ray traversal with respect to one or more primary rays is completed, ray generation may be performed with respect to the intersection point and one or more secondary rays are integrally generated.

The foregoing and/or other aspects are achieved by providing a graphics processing method for processing ray tracing, the method including distributing data of a ray to a plurality of traversal units, and processing, by the plurality of traversal units, traversal of the ray. Each of the plurality of traversal units may process ray traversal with respect to a subdivision of the entire space.

A node within a tree acceleration structure used for ray tracing may indicate the subdivision.

Each of the plurality of traversal units may correspond to a sub-tree indicating the subdivision. The sub-tree may be a portion of a tree acceleration structure used for ray tracing.

The distributing may include distributing the data of the ray to a traversal unit corresponding to a sub-tree that includes a node visited by the ray, among the plurality of traversal units.

The foregoing and/or other aspects are achieved by providing a non-transitory computer-readable medium comprising a program for instructing a computer to perform a method including distributing data of a ray to a plurality of traversal units, and processing, by the plurality of traversal units, traversal of the ray, wherein each of the plurality of traversal units may process ray traversal with respect to a subdivision of the entire space.

The foregoing and/or other aspects are achieved by providing an electronic device which includes a ray tracing unit including a management unit to analyze a tree acceleration structure (AS) corresponding to a subdivision of an entire space, and to control transmission of a ray to a plurality of traversal units which process traversal of the ray for the subdivision according to fit points associated with the tree AS, each fit point corresponding to a number of geometries within a sub-tree of the tree AS.

The number of geometries for a node within the sub-tree may be determined by the sum of the number of primitives corresponding to the node and the number of nodes of the sub-tree. The management unit may generate a fit point by determining a node as a fit point when the node has a largest number of geometries which is less than a predetermined threshold, along a path from a leaf node to a root node within the tree AS. The management unit may manage a fit point table by storing fit points mapped to a plurality of traversal units, and the management unit may perform routing of data using the fit point table For example, if a number of fit points is greater than a number of traversal units, fit points not allocated to a traversal unit are stored in a queue until at least one traversal unit processing traversal of a sub-tree corresponding to another fit point becomes idle. If a number of fit points is equal to or less than a number of traversal units, ray traversal with respect to all sub-trees of the tree AS may be simultaneously performed.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
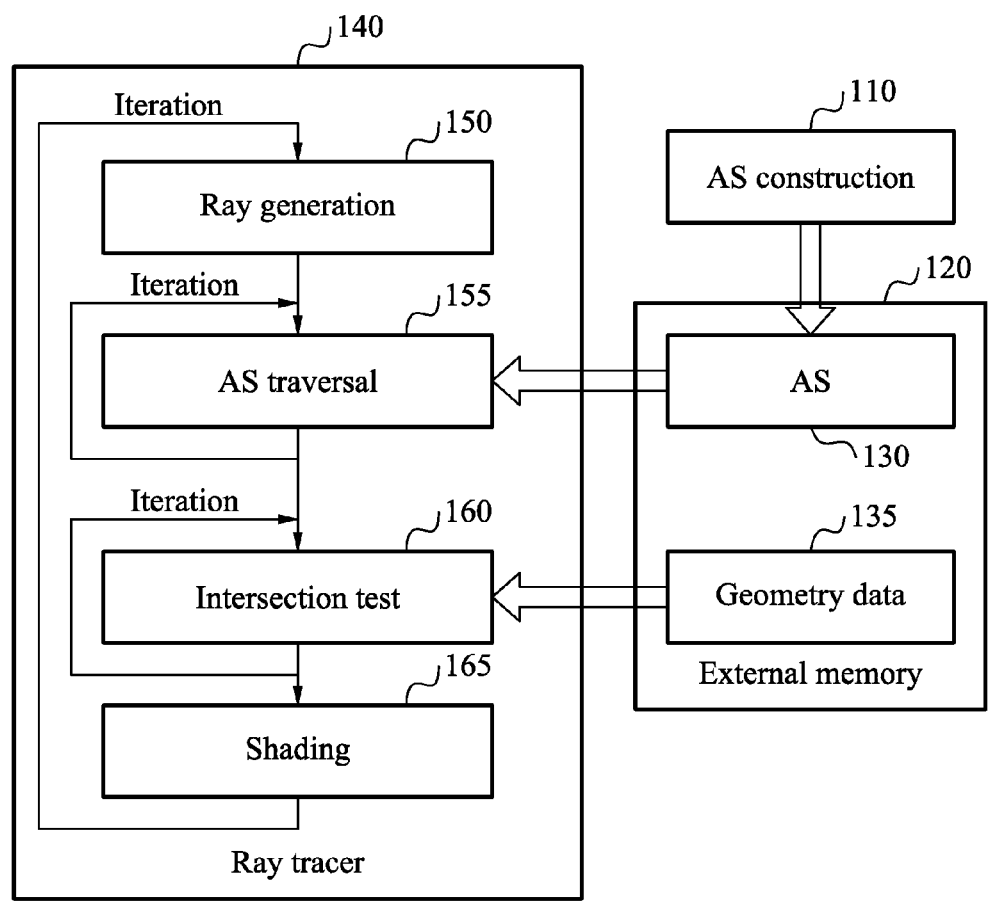
FIG. 1 illustrates a diagram to describe ray tracing according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

Hereinafter, the term "ray" may indicate or refer to a "ray object" that is a target of ray tracing, a "data structure" that indicates a ray, "information of a ray", or "data associated with a ray". Accordingly, the terms "ray", "ray object", "ray structure", "information of a ray", and "data associated with a ray" may be interchangeably used with respect to each other.

Hereinafter, the term "shading unit" may also be referred to as a "shader".

FIG. 1 illustrates a diagram to describe ray tracing according to an embodiment.

An acceleration structure (AS) construction 110 may indicate an operation or a process of constructing an AS 130 in an electronic apparatus or electronic device. The electronic apparatus or electronic device may be embodied as a computer, a personal computer, a portable computer, a mobile device such as a mobile phone, a smart phone, a personal media player, tablet, and the like. Generally, the electronic apparatus or electronic device may be any device which is capable of performing ray tracing according to the example embodiments disclosed herein. The electronic apparatus or electronic device may include a graphics processing unit (GPU) to perform ray tracing. The AS construction 110 may indicate or correspond to preprocessing of ray tracing. The AS 130 may be a tree AS. The AS construction 110 may indicate or correspond to a process of generating a hierarchical tree that represents a three-dimensional (3D) space. The 3D space that is a target of ray tracing may be generated in a form of the hierarchical tree. The 3D space may be a scene.

An external memory 120 may include, store, or provide the AS 130 and geometry data 135. The external memory may be realized for example, using a non-volatile memory device such as a read only memory (ROM), a random access memory (RAM), a programmable read only memory (PROM), an erasable programmable read only memory (EPROM), or a flash memory, a volatile memory device such as a random access memory (RAM), or a storage medium such as a hard disk or optical disk. However, the present invention is not limited thereto. Further, the external memory may provide the AS 130 and geometry data 140 over a wired or wireless network.

The AS 130 may be an AS that is generated through the AS construction 110. The AS 130 may be a tree AS that uses a tree structure. For example, the AS 130 may be a kd tree or bounding volume hierarchy (BVH). Also, the AS 130 may be a grid. A kd tree may refer to a type of space-partitioning data structure. A BVH may refer to a type of tree structure in which geometric objects may be enclosed in bounding volumes. The bounding volume may have different shapes. For example, a bounding volume may include a cuboid or a sphere. A grid may refer to a type of space-partitioning data structure which breaks up space into cells, for example, regularly-sized cells. For example, each of the cells may be of the same size or of different size. The AS 130 may be combination of one or more different tree structures (for example, the AS 130 may include a BVH and kd tree). The AS construction 110 may indicate or refer to a process of generating a tree structure in order to represent, in a form of a hierarchical tree, subdivisions of the entire space in which the 3D space is divided.

The AS 130 may be a binary tree. The AS 130 may include one or more nodes. Each of the one or more nodes of the AS 130 may be a root node, an inner node, or a leaf node. A type of a node may be a root node, an inner node, or a leaf node. Here, the root node may be regarded as the inner node.

Each of the nodes of the AS 130 may indicate a space. A space indicated by the node may be a subdivision of the entire space. The space indicated by the node may be a bounding box (BB) that is represented using two points, or an axis-aligned bounding box (AABB). The two points may be symmetrical vertices of a hexahedron or cuboid that is indicated by the bounding box. Each of faces of the hexahedron may be in parallel with one of an x axis, a y axis, and a z axis. For example, when a size of the entire space is expressed as (X, Y, Z), a space indicated by a root node of the AS 130 may be expressed using points (0, 0, 0) and point (X, Y, Z) that indicate the entire space.

Child nodes of a root node or an inner node may divide a space indicated by a parent node. The above division may be dividing of the space based on the x axis, the y axis, or the z axis. For example, a left child node and a right child node of the root node may divide the space indicated by the root node, based on a single point on the x axis. Subdivisions of the entire space may be generated through the above division. When the space indicated by the root node is divided based on a point $x_0$ on the x axis, a space indicated by the left child node of the root node may be expressed using points (0, 0, 0) and $(x_0, Y, Z)$. A space indicated by the right child node of the root node may be expressed using points $(x_0, Y, Z)$ and (X, Y, Z).

A space indicated by a node may be divided based on a level of the node. For example, child nodes of a $(3n+2)^{th}$ level may divide a space indicated by a parent node of a $(3n+1)^{th}$ level, based on a single point on the x axis. Child nodes of a $(3n+3)^{th}$ level may divide a space indicated by a parent node of a $(3n+2)^{th}$ level, based on a single point on the y axis. Child nodes of a $(3n+4)^{th}$ level may divide a space indicated by a parent node of a $(3n+3)^{th}$ level, based on a single point on the z axis. Here, n may denote an integer greater than or equal to 0, and the root node may denote a node of a first level. One of ordinary skill in the art would recognize that a division of space may be made along different axes, or in a different order, than the example division of space disclosed above. For example, a space indicated by a parent node may first be divided based on a single point on the y axis, and child nodes may further be divided based on a single point on the x axis, and a further division of those child nodes may be made based on a single point on the z axis.

The geometry data 135 may be data of a scene object within the 3D space. A primitive of the scene object may be a triangle. Alternatively, the scene object may be a triangle. However, the primitive may be in other geometric or polygonal forms, for example, a plane, sphere, cone, cylinder, torus, disc, and the like. For ease of discussion, the example embodiments disclosed herein will refer to a primitive in the form of a triangle, noting again that the primitive may take other forms.

A ray tracer 140 may perform one or more processes including ray generation 150, AS traversal 155, an intersection test 160, and shading 165.

In the operation of ray generation 150, a ray traveling toward the 3D space from a reference viewpoint may be generated. A ray may head from the reference viewpoint toward a predetermined pixel within a two-dimensional (2D) screen.

The ray generation 150 process may be iteratively performed with respect to each of the pixels within the 2D screen. For example, a virtual ray may be emitted from an origin toward each of the pixels within the 2D screen.

In the operation of AS traversal 155, a path of the ray may be traced using the AS 130. The AS traversal 155 may be a process of traversing nodes of an AS tree. Here, that the ray passes through a node may indicate that the ray passes through a space indicated by the node.

In an iteration of the AS traversal 155, the AS traversal 155 may reach a leaf node of the AS 130. When the AS traversal 155 reaches the leaf node of the AS 130, one or more scene objects corresponding to the leaf node may be specified. Here, a scene object corresponding to a leaf node may be a scene object that is positioned in a space indicated by the leaf node. For example, when a predetermined scene object is entirely or partially present within a space indicated by a predetermined leaf node, the scene object may correspond to the leaf node. Correspondence between a scene object and a leaf node may indicate that all of or a portion of the scene object is present within a space indicated by the leaf node. Data of the leaf node may include data of the scene object corresponding to the leaf node or data of a primitive of the scene object. The leaf node may include the corresponding scene object or primitive. Alternatively, the leaf node may indicate the corresponding scene object or primitive.

In the following embodiment, the AS traversal 155 may be performed by a ray traversal unit that includes a plurality of sub-pipeline units. Hereinafter, the ray TRV unit may also be referred to as a TRV unit. Each of a plurality of TRV units may process traversal of a ray that is input to a corresponding TRV unit.

A subdivision of the entire space in which ray tracing is performed may be allocated to each of the plurality of TRV units. Each of the plurality of TRV units may process ray traversal with respect to the allocated subdivision.

In an operation of the intersection test 160, whether each of a plurality of scene objects intersects the ray may be verified, and whether a scene object that intersects the ray is visible may be verified. For the above intersection test and visibility test, the intersection test 160 may be iteratively performed.

In the following embodiments, the intersection test may be performed by a ray intersection test unit. The ray intersection test unit may also be referred to as an IST unit.

In an operation of shading 165, a color value of a predetermined pixel within the 2D screen toward which the ray is emitted may be calculated based on a color value of a visible scene object intersected by the ray.

A rendering image may be generated by determining color values of pixels within the 2D screen.

When rays to be traced are primary rays, a similarity between the rays may be relatively high. Due to the high similarity, memory locality between data of the rays may be maintained. Due to the memory locality, efficiency of a cache used for ray tracing may be maintained to be high. However, when reflection, refraction, or transmission of a ray occurs due to intersecting between a primary ray and a scene object, and when a secondary ray is generated, a similarity between rays may decrease. In particular, when a global illumination rendering algorithm, such as path tracing and photon mapping, is employed for ray tracing, secondary rays may be omni-directionally generated. The similarity between the secondary rays may significantly decrease and the cache efficiency may also decrease.

In order to achieve a high efficiency of a cache for processing of an incoherent ray such as a secondary ray, a tree AS structure may be subdivided into sub-trees that may be appropriate for a cache of a TRV unit in the following embodiment. According to a divide-and-conquer scheme, the sub-trees may be locally processed by the plurality of TRV units. Through the local processing, cache locality may be enhanced and the entire ray tracing performance may also be enhanced.

Figure 2:
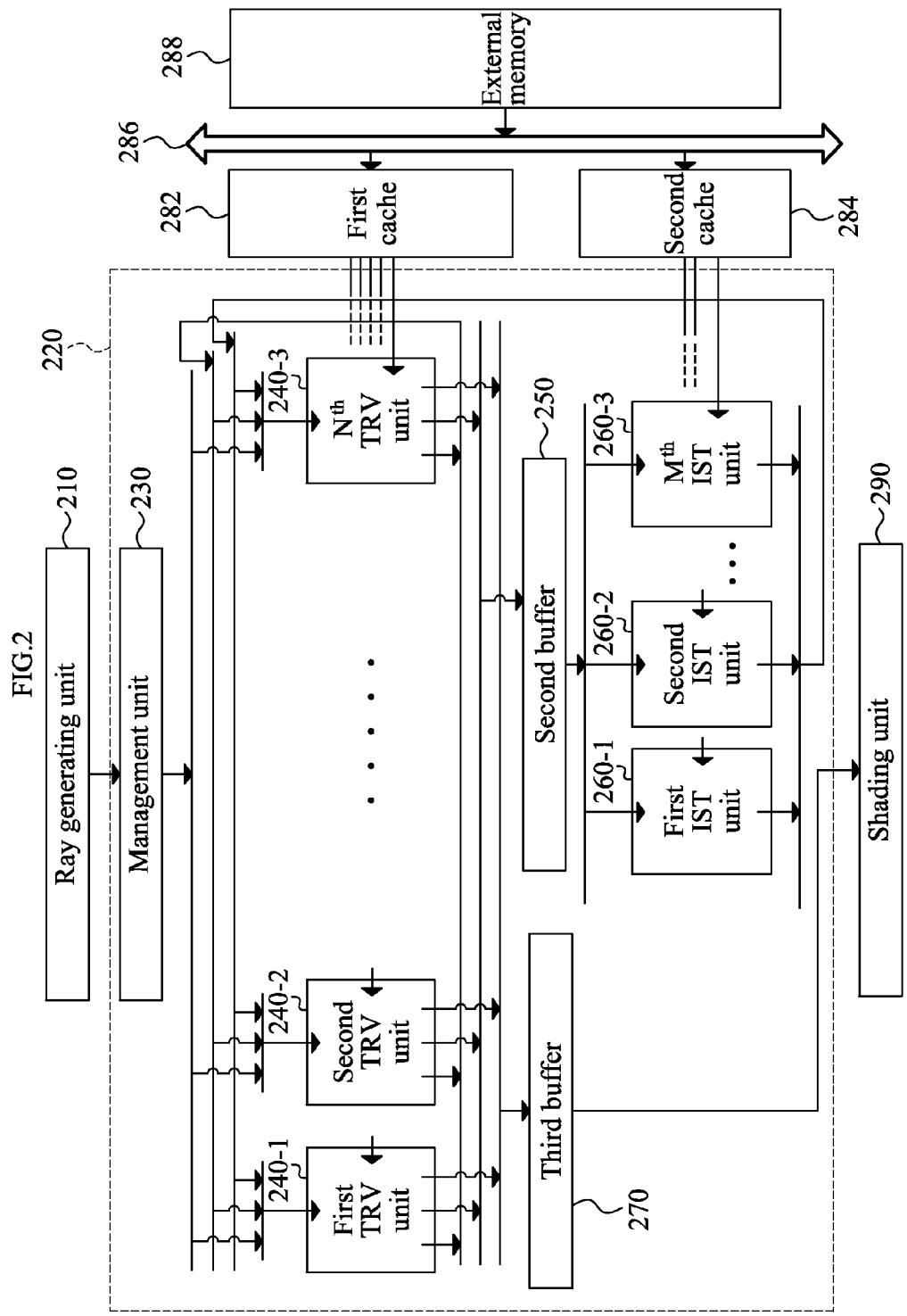
FIG. 2 illustrates a structure of a graphics processing apparatus and entities associated with the graphics processing apparatus according to an embodiment.

FIG. 2 illustrates a structure of a graphics processing apparatus and entities associated with the graphics processing apparatus according to an embodiment.

FIG. 2 may illustrate a structure of a graphics processing unit (GPU) or rendering hardware to perform ray tracing.

The configuration of FIG. 2 may include a ray generating unit 210, a ray tracing unit 220, a first cache 282, a second cache 284, a bus 286, an external memory 288, and a shading unit 290. The ray generating unit 210, the first cache 282, the second cache 284, and the shading unit 290 may be constituent components of the graphics processing apparatus. The GPU may include the ray generating unit 210, the first cache 282, the second cache 284, and the shading unit 290.

The GPU or the ray tracing unit 220 may correspond to the ray tracer 140 described above with reference to FIG. 1. The external memory 288 may correspond to the external memory 120 of FIG. 1. The ray generating unit 210 may perform the ray generation 150. The shading unit 290 may perform the shading 165. Also, even though not illustrated, the ray generating unit 210 and the shading unit 290 may be included in the ray tracing unit 220.

The ray generating unit 210 may generate a ray. The ray generating unit 210 may provide data of the generated ray to the ray tracing unit 220. The ray generating unit 210 may indicate an operation or an entity of providing data of a ray to the ray tracing unit 220.

The ray tracing unit 220 may process ray tracing. The ray tracing unit 220 may provide, to the shading unit 290, data of the ray of which tracing is processed or completed.

The shading unit 290 may process shading with respect to the traced ray, based on data of the ray of which tracing is processed. The shading unit 290 may indicate an operation or an entity of processing shading after ray tracing is processed. Shading may indicate finally determining a color of a pixel within a 2D screen by summing up tracing results of rays that are accumulated with respect to the pixel within the 2D screen.

The first cache 282 and the second cache 284 may cache data required to process ray tracing. The data required to process ray tracing may be stored in the external memory 288. Each of the first cache 282 and the second cache 284 may cache a portion of data stored in the external memory 288. Data related to ray tracing may be transmitted between the first cache 282 and the external memory 288 or between the second cache 284 and the external memory 288 through the bus 286. That is, there may be a wired connection between the first cache 282 and the external memory 288 and between the second cache 284 and the external memory 288. Here, data stored in the first cache 282 may be a portion of the AS 130, and data stored in the second cache 284 may be a portion of the geometry data 135.

The first cache 282 may provide data required to process traversal of a ray to a cache of a TRV unit, which will be described later. The second cache 284 may provide data required to process an intersection test of a ray to a cache of an IST unit, which will be described later. Accordingly, each of the cache of the TRV unit and the cache of the IST unit may be referred to as a level 1 cache, and each of the first cache 282 and the second cache 284 may be referred to as a level 2 cache.

Hereinafter, constituent components of the ray tracing unit 220 will be described.

The ray tracing unit 220 may include a management unit 230, one or more TRV units 240-1 through 240-3, a second buffer 250, one or more IST units 260-1 through 260-3, and a third buffer 270.

Referring to FIG. 2, the one or more TRV units may include a first TRV unit 240-1, a second TRV unit 240-2, and an $N^{th}$ TRV unit 240-3. Here, N may denote an integer greater than or equal to 1. The one or more IST units may include a first IST unit 260-1, a second IST unit 260-2, and an $M^{th}$ IST unit 260-3. Here, M may denote an integer greater than or equal to 1. When there are a plurality of TRV units, N may denote an integer greater than or equal to 2, and when there are a plurality of IST units, M may denote an integer greater than or equal to 2.

The ray tracing unit 220 may search for a leaf node initially visited by a ray, through hierarchical traversal from a root node of a tree AS to a lower node. When the leaf node is visited through the above search, the ray tracing unit 220 may perform an intersection test between the ray and a primitive of a scene object corresponding to the leaf node. Here, the number of primitives of the scene object corresponding to the leaf node may be plural. When a primitive intersecting the ray is not found within the visited leaf node, the ray tracing unit 220 may search for a primitive intersecting the ray by continuing traversal of the tree AS. That is, if the ray does not intersect the primitive when visiting the leaf node, the ray tracing unit 220 may continue the TRV in another portion of the tree to determine whether a primitive (e.g. a scene object) intersects the ray. The above traversal and intersection test may be performed by a TRV unit and an IST unit, respectively. Each of the one or more IST units may perform an intersection test between the primitive and the ray using the tree AS.

As described above, due to a ray tracing characteristic, the ray tracing may simultaneously require a large amount of operations and a wide memory bandwidth. For example, every time a node is visited or every time an intersection test is performed, data of the node or data of the primitive is fetched from the external memory 288 and then the above operations need to be performed. Accordingly, each of the TRV units employed for the traversal and the IST units employed for the intersection test may include a cache. When data of the node or data of the primitive is absent within the cache, long latency may occur in fetching data from the external memory 288 and the ray tracing performance may be degraded.

The management unit 230 may control transmission of a ray between the ray generating unit 210 and the plurality of TRV units. The management unit 230 may store a ray that is input to the ray tracing unit 220, and may distribute, to one or more of the plurality of TRV units, the input ray.

The management unit 230 may distribute, to the plurality of TRV units, data of a ray processed by the GPU.

Each of the plurality of TRV units may process ray traversal with respect to a subdivision of the entire space. The entire space may be a space in which the ray tracing is performed. Subdivisions of the entire space in which the plurality of TRV units performs ray traversal, respectively, may differ and may not overlap each other. For example, a subdivision of the entire space may be allocated to a TRV unit, and different subdivisions of the entire space may be allocated to the plurality of TRV units, respectively. The entire space may be spatially divided into a plurality of subdivisions.

Each of the plurality of TRV units may process ray traversal with respect to a subdivision of the entire space allocated to a corresponding TRV unit. Based on a subdivision in the entire space in which ray tracing is performed, ray traversal may be processed by a TRV unit to which the above subdivision is allocated.

Each of the plurality of TRV units may include a cache for processing ray traversal. The cache may be a level 1 cache of FIG. 2.

One or more rays may be input to the ray tracing unit 220. The one or more rays may be sequentially input to the ray tracing unit 220.

A ray input to one of the plurality of TRV units may be a ray that is newly generated by the ray generating unit 210, a ray of which traversal is being processed by the plurality of TRV units, or a ray of which an intersection test is processed by one or more IST units. A ray output by one of the plurality of TRV units may be input to another TRV unit among the plurality of TRV units, an IST unit that is selected by the second buffer 250 from among the one or more IST units, or the shading unit 290.

The third buffer 270 may store a ray to be output to the shading unit 290. One or more rays may be stored in the third buffer 270. When traversal of the ray is completed, data of the ray may be transmitted from the TRV unit to the shading unit 290.

The ray to be output to the shading unit 290 may wait for being output in the third buffer 270. That is, a plurality of rays may be output to the third buffer 270, and when TRV is completed, data associated with the plurality of rays may be output to the shading unit 290.

The second buffer 250 may arbitrate transmission of a ray between the plurality of TRV units and the one or more IST units. When the ray reaches a leaf node, an intersection test of the ray may be performed. Accordingly, the ray may be output from a TRV unit and may be input to an IST unit through the second buffer 250. For example, the second buffer 250 may control flow of data of the ray between the plurality of TRV units and the one or more IST units.

The one or more IST units may process an intersection test of a ray. The ray of which the intersection test is being processed may be a ray that is traversed within a tree AS by the plurality of TRV units.

A ray may pass or travel through one or more spaces. Accordingly, even though an intersection test of the ray is performed, traversal of the ray may continue. A ray to be output by a single IST unit among the one or more IST units may be input to a single TRV unit among the plurality of TRV units more than one time, for example.

Figure 3:
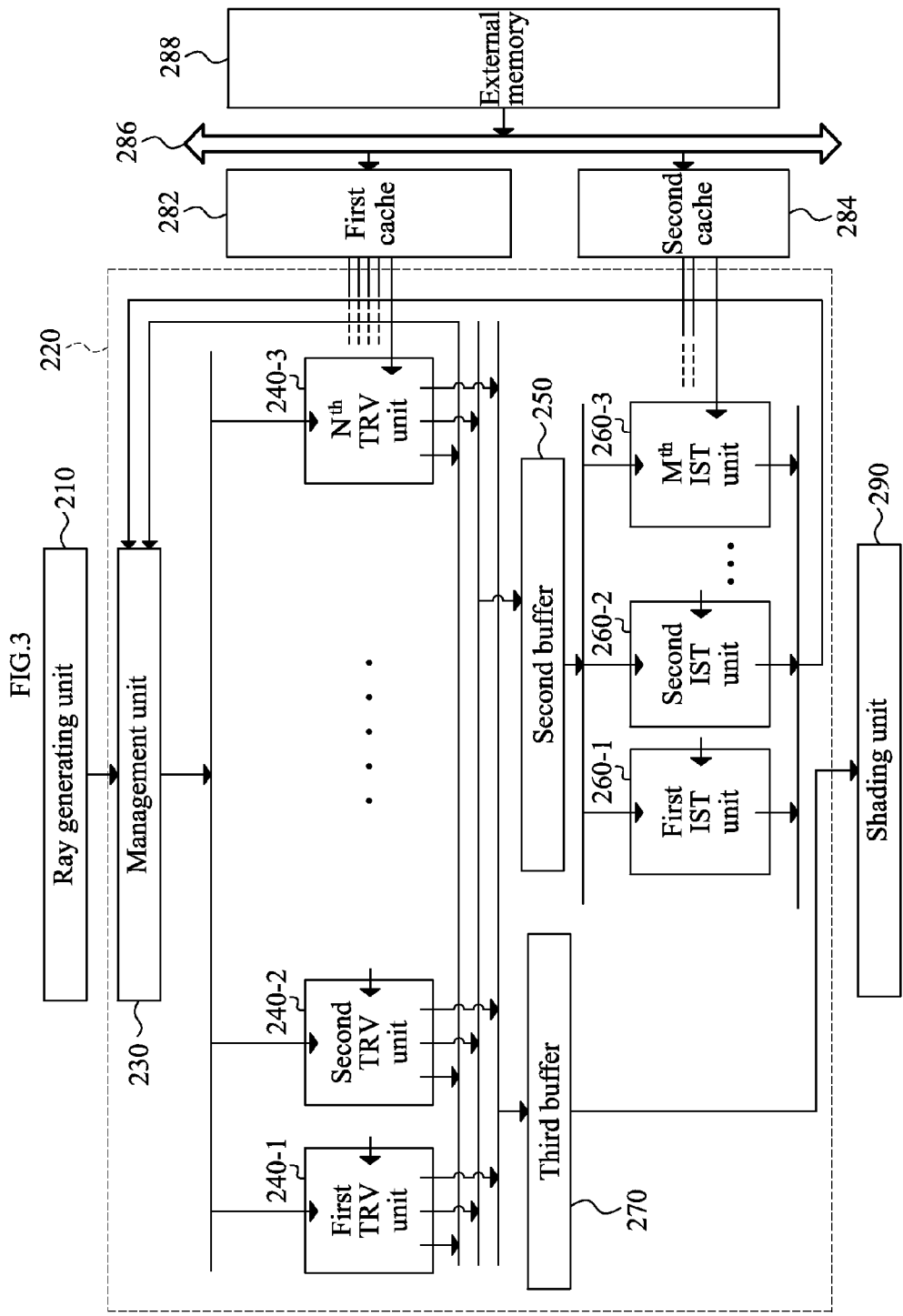
FIG. 3 illustrates a structure of a graphics processing apparatus and entities associated with the graphics processing apparatus according to another embodiment.

FIG. 3 illustrates a structure of a graphics processing apparatus and entities associated with the graphics processing apparatus according to another embodiment.

The ray input to the ray tracing unit 220 in FIG. 2 may be distributed to a single TRV unit among the plurality of TRV units by the management unit 230. As traversal of the tree AS proceeds, data of the ray may be processed by the plurality of TRV units and one or more IST units.

Referring to FIG. 3, a ray output from a TRV unit or an IST unit may be input again to the management unit 230, and may be input to a single TRV unit among the plurality of TRV units through distribution of the management unit 230, which is different from the embodiment of FIG. 2. For example, every time traversal of the ray is iterated by a TRV unit, the management unit 230 may determine a TRV unit to process the traversal among the plurality of TRV units. By way of example, the management unit 230 may determine that a first TRV unit may receive a ray to perform a traversal after a ray is generated by the ray generating unit 210. The management unit 230 may determine that a second TRV unit may receive a ray after a first traversal operation is performed by the first TRV unit. The management unit 230 may determine that a third TRV unit may receive a ray after a second traversal operation is performed by the second TRV unit and an intersection test is performed by an IST unit. The third TRV unit may perform a third traversal operation on the ray and subsequently the data of the ray may be sent to the shading unit after ray tracing is completed.

Figure 4:
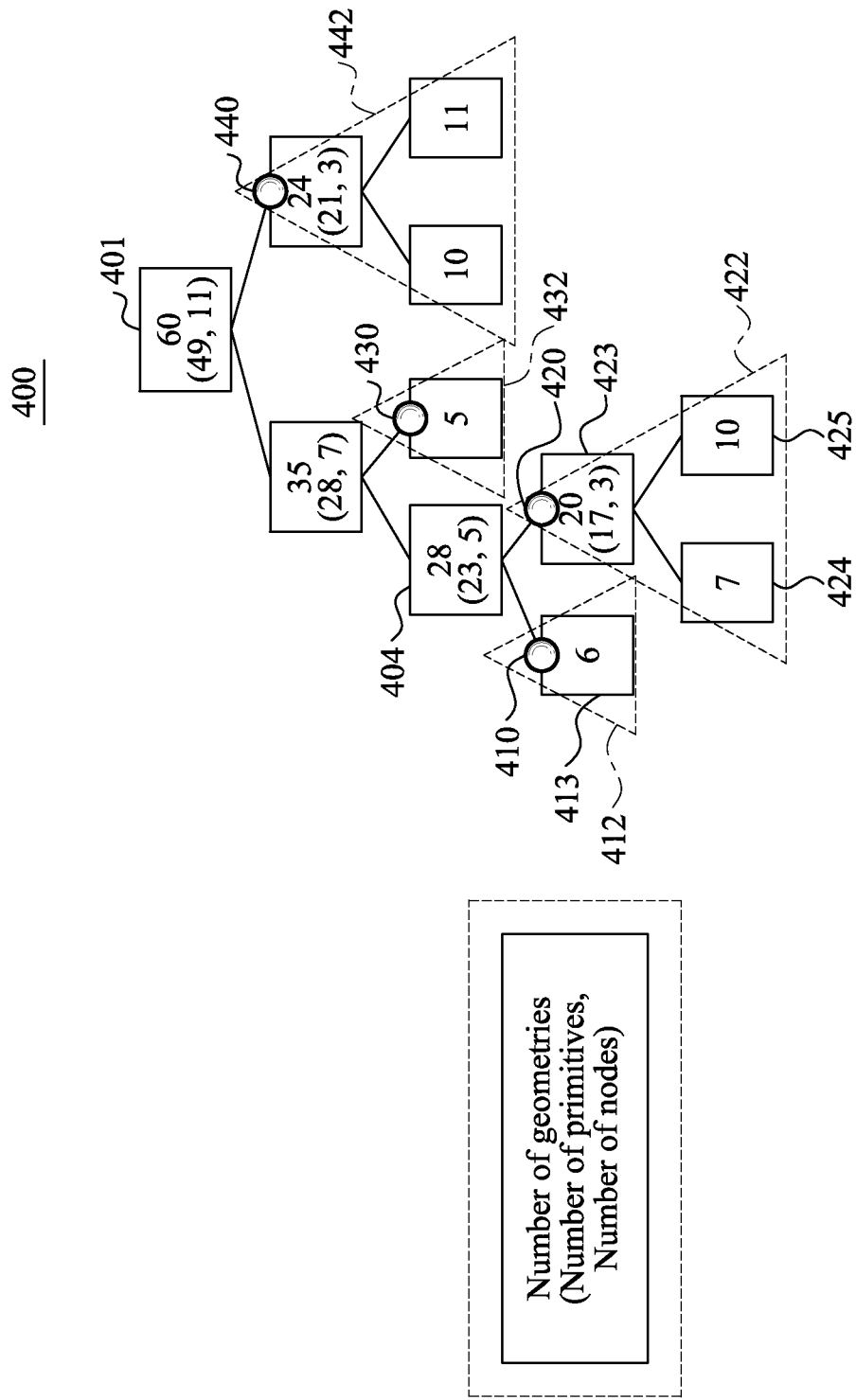
FIG. 4 illustrates division of a tree acceleration structure (AS) and a fit point according to an embodiment.

FIG. 4 illustrates division of a tree AS 400 and a fit point according to an embodiment.

Referring to FIG. 4, the tree AS may be a binary tree.

Each node may become a root node of a sub-tree.

A number within each node may quantize and thereby indicate the number of geometries included in a sub-tree. Here, the sub-tree may be a tree having the node as a root node. A node may have one or more geometries. For example, a node may correspond to one or more geometries. The number of geometries included in the sub-tree may be a summation of the number of geometries included in each of the nodes within the sub-tree.

For example, the number of geometries included in a leaf node may be the number of primitives corresponding to the leaf node. A primitive corresponding to a leaf node may be a primitive of a scene object that is positioned within a space indicated by the leaf node. The primitive may be a triangle. For example, a number within the leaf node may indicate the number of triangles corresponding to the leaf node.

For example, a number within an inner node may be a summation of a first value and a second value. The first value may be the number of aggregations of geometries included in nodes of a sub-tree. Here, the sub-tree may be a tree having the inner node as a root node. The second value may be the number of nodes of the sub-tree. For example, in FIG. 4, node 401 may be a root node. In FIG. 4, as one example, node 401 has a first value of "49" which corresponds to the number of aggregations of geometries included in nodes of a sub-tree (here it is the sum of "28" and "21" as shown in the nodes of the sub-tree of node 401). Further, node 401 has a second value of "11" corresponding to the number of nodes of the sub-tree (the sum of "7"+"3"+"1"). Here, the sub-tree may be a tree having the inner node as a root node.

Referring to FIG. 4, a first number within a bracket indicated in an inner node may denote the number of aggregations of geometries included in nodes of a sub-tree. A second number may denote the number of nodes of the sub-tree. Here, the sub-tree may be a tree having the inner node as a root node.

The number of geometries of a node may be expressed as a summation of the first value and the second value. Referring again to FIG. 4, as one example, the number of geometries of node 401 is equal to 60, which is the summation of the first value of "49" and the second value of "11". The first value may denote the number of aggregations of geometries included in nodes of a sub-tree. The second value may denote the number of nodes of the sub-tree. Here, the sub-tree may be a tree having the inner node as a root node.

The management unit 230 may determine one or more fit points within the tree AS 400. Here, a fit point may indicate or refer to a root node of a sub-tree within the tree AS 400, and may indicate or refer to a node within the tree AS 400. That is, the fit point may correspond to a node of the sub-tree, and may more specifically correspond to a root node. There may be a plurality of fit points within a tree AS. FIG. 4 illustrates a first fit point 410, a second fit point 420, a third fit point 430, and a fourth fit point 440. The tree AS 400 in the example embodiment of FIG. 4 includes a first sub-tree 412, a second sub-tree 422, a third sub-tree 432, and a fourth sub-tree 442. A root node 413 of the first sub-tree 412, a root node 423 of the second sub-tree 422, a root node of the third sub-tree 432, and a root node of the fourth sub-tree 442 may correspond to the first fit point 410, the second fit point 420, the third fit point 430, and the fourth fit point 440, respectively. Alternatively, the root node 413 of the first sub-tree 412, the root node 423 of the second sub-tree 422, the root node of the third sub-tree 432, and the root node of the fourth sub-tree 442 may be the first fit point 410, the second fit point 420, the third fit point 430, and the fourth fit point 440, respectively.

A fit point may be a root node of a sub-tree allocated to a TRV unit. That the sub-tree is allocated to the TRV unit may indicate that the TRV unit processes traversal of a ray within the sub-tree. For example, when traversal of a ray is performed within a node of a predetermined sub-tree, the management unit 230 may transmit data of the ray to a TRV unit to which the predetermined sub-tree is allocated, among a plurality of TRV units. Each of the plurality of TRV units may process ray traversal with respect to an area indicated by an allocated fit point in the tree AS 400 that is used for ray tracing. The area indicated by the fit point may be a sub-tree of the tree AS 400 having a node corresponding to the fit point as a root node. For example, with reference to FIG. 4, a first TRV unit may process a first area (e.g., a subdivision of space within an entire space of an AS) corresponding to a first fit point 410, a second TRV unit may process a second area corresponding to a second fit point 420, a third TRV unit may process a third area corresponding to a third fit point 430, and a fourth TRV unit may process a fourth area corresponding to a fourth fit point 440. Each of the first through fourth fit points may correspond to a sub-tree of the tree AS 400, which each of the first through fourth TRV units process ray traversal, respectively.

A fit point may be determined based on a capacity of data that may be stored in a cache of a TRV unit. When a predetermined fit point is a root node of a predetermined sub-tree, ray traversal with respect to the sub-tree may be allocated to a single TRV unit among the plurality of TRV units. A cache of a TRV unit may need to store data required for ray traversal with respect to a sub-tree so that the TRV unit may efficiently perform ray traversal with respect to the sub-tree.

Data required for traversal of a ray may include data of a primitive. As described above, a primitive may correspond to a leaf node. For example, as a leaf node within a sub-tree corresponds to a further large number of primitives, a cache with greater capacity may be required in order to store data of the primitives. Also, data required for traversal of a ray may include data used to identify nodes within a sub-tree. For example, as the number of nodes within a sub-tree increases, a cache with a greater capacity may be required to store data or identifying the nodes within the sub-tree. For example, with reference to FIG. 4, a second TRV unit corresponding to the second fit point 420 may require a greater capacity to store data of the sub-tree corresponding to the second fit point 420, as compared to the first TRV unit corresponding to the first fit point 410, since the number of primitives corresponding the second fit point 420 is greater than the number of primitives corresponding to the first fit point 410. Further, the number of geometries of the second fit point 420 is greater than the number of geometries of the first fit point 410.

For example, a fit point may be a root node of a sub-tree that may be managed by a cache of a TRV unit. That the cache of the TRV unit may manage the sub-tree may indicate that the cache of the TRV unit has capacity enough to cache data required for the cache of the TRV unit to perform traversal of a ray within the sub-tree.

A fit point may also be determined based on a maximum number of geometries that may be stored in a cache of a TRV unit. The maximum number of geometries that may be stored in the cache of the TRV unit is referred to as a maximum geometry number. In FIG. 4, the maximum number of geometries that may be stored in the cache is set to "25", as one example. However, the maximum number of geometries may be a predetermined threshold stored in the cache, and "25" is merely used as one example. The number may be greater than or less than "25". The number which may be used as a predetermined threshold may be changeable. The predetermined threshold may be set according to a capacity of data that may be stored in a cache of a TRV unit. Thus, if a cache of a TRV unit may store a greater capacity relative to another TRV unit, the predetermined threshold (or maximum number of geometries) may be relatively higher relative to the other TRV unit. Alternatively, a fit point may be determined using a maximum number of primitives.

The management unit 230 may generate a fit point corresponding to a node having the number of geometries less than the maximum geometry number by comparing the number of geometries of the node and the maximum geometry number. Alternatively, the management unit 230 may determine, as a fit point, a node having the number of geometries less than the maximum geometry number by comparing the number of geometries of the node and the maximum geometry number.

The management unit 230 may determine, as a fit point, a node having the number of geometries less than the maximum geometry number and having the largest number of geometries among nodes present within a path from a leaf node to a root node.

For example, in a path from a node 413 to a root node 401, nodes 404 and 413 may be nodes having the number of geometries less than the maximum geometry number. In this example, the node 413 may be a node having the largest number of geometries. Accordingly, the node 413 may become the first fit point 410, or the first fit point 410 corresponding to the node 413 may be generated. Here, it can be seen from FIG. 4 that the number of geometries of node 404 is greater than "25" and therefore exceeds the maximum geometry number. Thus, on the path from node 413 to root node 401, node 413 is determined as a fit point since it has the largest number of geometries which is less than the maximum number of geometries along the path.

Also, in a path from a node 424 to the root node 401, the node 423 may be a node having the number of geometries less than the maximum geometry number and having the largest number of geometries. Accordingly, the node 423 may become the second fit point 420, or the second fit point 420 corresponding to the node 423 may be generated. A sub-tree corresponding to the generated second fit point 420 may include a node 425. Accordingly, a fit point corresponding to the node 425 may not be separately generated. Using the aforementioned principle, the third fit point 430 and the fourth fit point 440 may be generated. The number of geometries of a node corresponding to each of the first fit point 410, the second fit point 420, the third fit point 430, and the fourth fit point 440 may be less than or equal to the maximum geometry number. The number of geometries of a parent node of a corresponding node may be further greater than the maximum geometry number.

As described above, a fit point may be determined based on at least one of the number of primitives corresponding to one or more leaf nodes of a sub-tree and the number of nodes of the sub-tree. Here, a sub-tree may be a sub-tree of the tree AS 400 having a node corresponding to a fit point as a root node.

Also, a fit point may be determined based on a size of data associated with the fit point and a capacity of a cache of a TRV unit. Data associated with the fit point may be data required for ray traversal with respect to a sub-tree having a node corresponding to the fit point as a root node.

For example, a fit point may be regarded as information that enables a sufficiently large sub-tree to be manageable by a cache of a TRV unit to be allocated to the TRV unit. Using the fit point and the sub-tree, the TRV unit may perform localized traversal of a ray.

The management unit 230 may calculate the number of geometries of each of nodes by traversing the tree AS 400 in a depth-first order, and may determine the fit point.

When generation or determination of a fit point is completed, traversal of a ray may be performed based on the fit point.

The management unit 230 may allocate subdivisions of the entire space to the plurality of TRV units based on generated fit points. For example, subdivisions of the entire space, fit points, or sub-trees of the tree AS 400 corresponding to the fit points may be allocated to the plurality of TRV units. For example, with reference to FIG. 4, a subdivision of space may correspond to the first fit point 410 and may be allocated to a first traversal unit. Further, root node 412 and first sub-tree 413 may be allocated to the first traversal unit. Likewise, a subdivision of space may correspond to the second fit point 420 and may be allocated to a second traversal unit. Further, root node 423 and second sub-tree 422 may be allocated to the second traversal unit.

As described above with reference to FIG. 1, a node within the tree AS 400 may correspond to a subdivision of the entire space. Also, a sub-tree having a node as a root node may correspond to a subdivision of the entire space. Accordingly, when each of the plurality of TRV units performs ray traversal with respect to the subdivision of the entire space, a single node of nodes within the tree AS 400 used for ray tracing may indicate the subdivision. The subdivision may be a BB or an AABB.

Using a fit point, each of the plurality of TRV units may correspond to a sub-tree indicating a subdivision of the entire space. The sub-tree may be a portion of the tree AS used for ray tracing, and may correspond to the fit point.

The management unit 230 may distribute data of a ray to a TRV unit corresponding to a sub-tree including a node that is visited by the ray among the plurality of TRV units.

One or more sub-trees may be present, and each of the one or more sub-trees may not overlap within the tree AS 400. That is, each sub-tree may correspond to a different subdivision of space within the entire space.

Fit points may be mapped to the plurality of TRV units, respectively. Through the above mapping, a corresponding relationship between a fit point and a TRV unit may be generated. The management unit 230 may manage a fit point table indicating the above mapping. The fit point table may be a look-up table. The management unit 230 may perform routing of data of a ray using the fit point table. For example, the management unit 230 may distribute data of the ray to a single TRV unit among the plurality of TRV units using the fit point table. The fit point table may be stored in a buffer of the management unit 230.

Data of a ray may be generated by the ray generating unit 210. The ray may not be traversed in sub-trees corresponding to fit points by the ray generating unit 210. For example, in FIG. 4, a root node may not be included in any of the sub-trees. Accordingly, data of an initially generated ray may be arbitrarily distributed to a TRV unit among the plurality of TRV units by the management unit 230. Traversal of a ray by the TRV unit to which data of the ray is distributed may be performed until the ray reaches a node or a sub-tree corresponding to a predetermined fit point. By referring to the fit point table, the TRV unit may verify a TRV unit to which a sub-tree corresponding to the fit point reached by the ray is allocated. When the fit point reached by the ray or a fit point corresponding to the node reached by the ray is present within the fit point table, the TRV unit may perform routing of data of the ray with respect to the TRV unit to which the sub-tree corresponding to the fit point is allocated. A new TRV unit may continuously perform ray traversal with respect to the routed data of the ray. Through the above process, traversal of a ray occurring in a predetermined sub-tree may be intensively performed by a predetermined TRV unit. Accordingly, a cache hit ratio of a TRV unit may be enhanced.

When a ray visits a leaf node and an intersection test of the ray is completed, traversal with respect to a sub-tree may be completed. Next, the ray may visit an upper node and may also visit a node corresponding to another fit point. Data of the ray may be processed by a TRV unit to which a sub-tree of the newly visited node is allocated.

For the above routing and visiting of the upper node, the plurality of TRV units may share a global stack for traversal of a ray.

Hereinafter, traversal of a ray using a queue according to an embodiment will be described with reference to FIG. 5 and FIG. 6.

Figure 5:
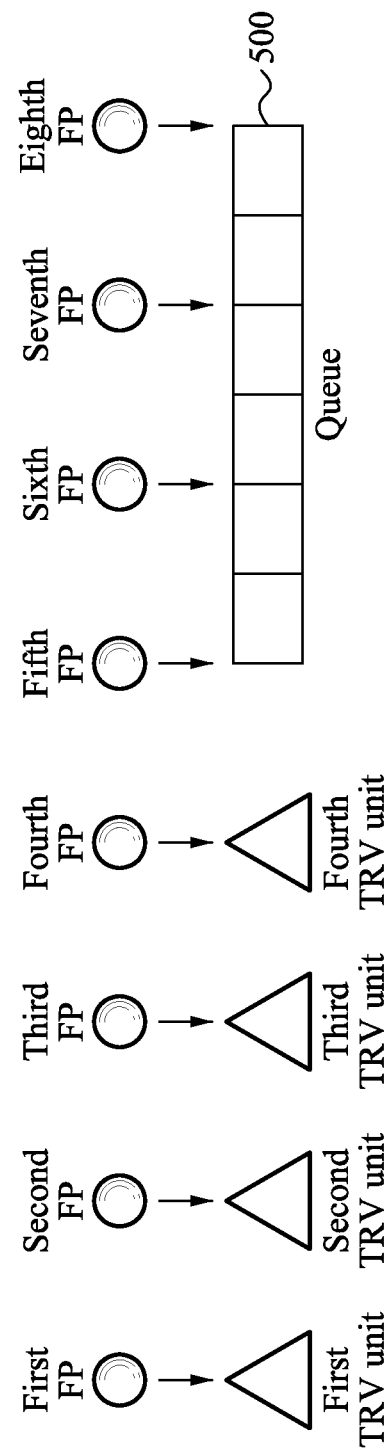
FIG. 5 illustrates a diagram to describe a method of storing overall data associated with ray traversal using a queue according to an embodiment.

FIG. 5 illustrates a diagram to describe a method of storing overall data associated with ray traversal using a queue according to an embodiment.

For example, when the number of fit points or the number of sub-trees is greater than the number of a plurality of TRV units, ray traversal with respect to all of the sub-trees may not be simultaneously performed. For example, ray traversal within a predetermined sub-tree may not be processed by the plurality of TRV units.

For example, when eight fit points and four TRV units are present as illustrated in FIG. 5, the fifth to eighth fit points may not be allocated to a TRV unit. Accordingly, ray traversal with respect to sub-trees corresponding to the fifth to eighth fit points may be deferred.

In a case in which the fifth fit point is not mapped to a TRV unit, when the ray visits a node corresponding to the fifth fit point, the fifth fit point may be absent in a fit point table. Accordingly, until an idle TRV unit appears, ray traversal with respect to a sub-tree corresponding to each of the fifth to eighth fit points may not be processed. To defer the above ray traversal, a TRV unit may store data of a ray in a queue 500. For example, data of a ray that visits a node of a first sub-tree not corresponding to the plurality of TRV units among one or more sub-trees may be stored in the queue 500.

Figure 6:
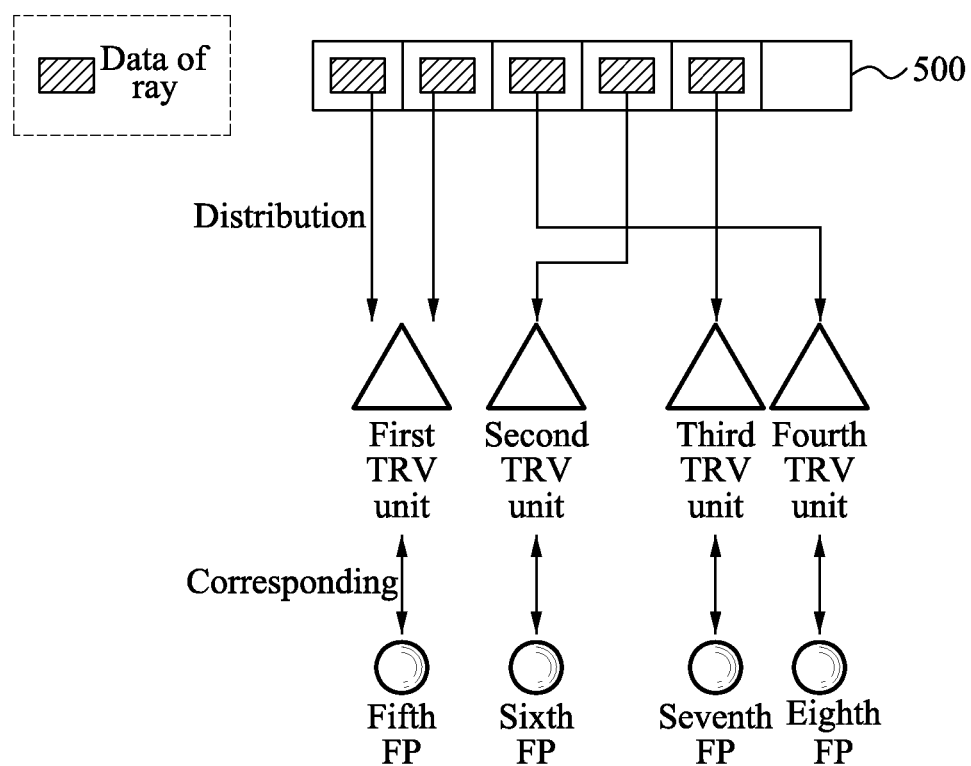
FIG. 6 illustrates a diagram to describe a method of processing data of a ray stored in a queue according to an embodiment.

FIG. 6 illustrates a diagram to describe a method of processing data of a ray stored in a queue according to an embodiment.

Mapping between a fit point and a TRV unit may be dynamically changed. For example, when a ray is absent within a predetermined sub-tree, the management unit 230 may allocate another sub-tree to a TRV unit to which the sub-tree is allocated. A fit point table in which the other sub-tree is allocated to the TRV unit may be updated.

In FIG. 6, first to fourth TRV units may correspond to the fifth to eighth fit points, respectively. A new sub-tree is allocated to each of the first to fourth TRV units.

When a new sub-tree is allocated to a TRV unit, data of a ray present within the queue 500 may be dequeued. The dequeued data of the ray may be processed by a TRV unit to which a sub-tree including a node visited by the ray is allocated. For example, the management unit 230 may distribute data of a first ray and data of a second ray present within the queue 500 to the first TRV unit to which a sub-tree corresponding to the fifth fit point is allocated. Each of the first ray and the second ray may visit a node within the sub-tree corresponding to the fifth fit point. That is, data corresponding to a ray may be distributed to a single TRV unit, and data corresponding to a plurality of rays which visit a node within a sub-tree corresponding to a fit point, may also be distributed to a single TRV unit.

For example, the management unit 230 may allocate, to a first sub-tree, the first TRV unit among the plurality of TRV units, and may distribute, to the first TRV unit, data of a ray that visits a node of the first sub-tree stored in the queue 500. Further, as can be seen from FIG. 6, data in a queue need not be sequentially assigned or distributed to TRV units. For example, data in a queue may be distributed to a fourth TRV unit before data in a queue is distributed to the second TRV unit and/or the third TRV unit. Alternatively, as can be seen from FIG. 6, data in a queue may be distributed to TRV units sequentially according to the allocated fit points (i.e., first through fourth TRV units receive data associated with the fifth through eighth fit points). In FIG. 6, however, the data associated with the fifth through eighth fit points may not be stored sequentially in the queue.

Figure 7:
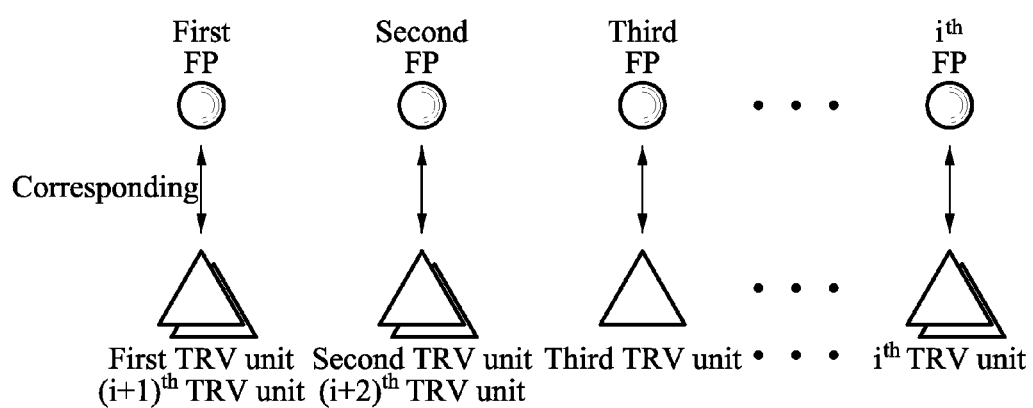
FIG. 7 illustrates a diagram to describe a process of allocating a plurality of traversal (TRV) units to a sub-tree according to an embodiment.

FIG. 7 illustrates a diagram to describe a process of allocating a plurality of TRV units to a sub-tree according to an embodiment.

In FIG. 7, it is assumed that i fit points and (i+2) TRV units are present. A first fit point may correspond to a first TRV unit and an $(i+1)^{th}$ TRV unit.

When the number of fit points is less than or equal to the number of the plurality of TRV units, ray traversal with respect to all of the sub-trees may be simultaneously performed. Accordingly, the method of using the queue 500, described above with reference to FIG. 5 and FIG. 6 may not be required. Also, traversal of a ray may be accelerated by allocating a single fit point or a single sub-tree to the plurality of TRV units. To map a single fit point to the plurality of TRV units, a fit point table may support multiple mapping. Thus, a subdivision of space corresponding to a sub-tree within the AS and a fit point, ray traversal for a ray corresponding to the single fit point may be processed by multiple TRV units.

A second sub-tree among one or more sub-trees may correspond to two or more TRV units among the plurality of TRV units. The management unit 230 may determine a TRV unit to transfer data of a ray that visits a node of the second sub-tree among the two or more TRV units, based on load balancing. The management unit 230 may determine a TRV unit to transfer data of a ray, based on a state of an input buffer of each of the two or more TRV units. The management unit 230 may transfer data of a ray visiting a node of the second sub-tree to a TRV unit having the relatively smaller number of items of data of the ray within an input buffer among the two or more TRV units.

Figure 8:
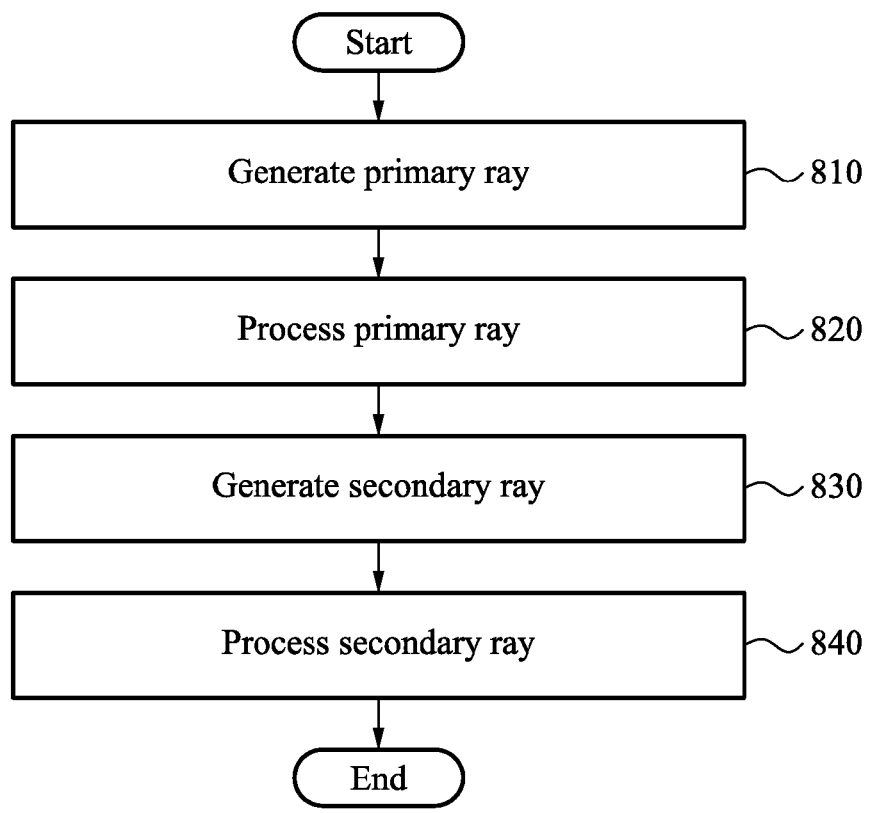
FIG. 8 illustrates a method of processing a secondary ray according to an embodiment.

FIG. 8 illustrates a method of processing a secondary ray according to an embodiment.

In operation 810, the ray generating unit 210 may generate one or more primary rays. Primary rays may be embodied as any ray which is emitted from a viewpoint toward a scene object or primitive in a scene.

In operation 820, the ray tracing unit 220 may process ray tracing with respect to each of the one or more primary rays.

When one or more IST units perform an intersection test with respect to a primary ray, an intersection point of the primary ray may occur. For example, the intersection point may be generated through the intersection test of the primary ray.

The ray tracing unit 220 may store the generated intersection point. The generated intersection point may be stored for each of one or more IST units.

In operation 830, when processing of the one or more primary rays is completed, the ray generating unit 210 may generate one or more secondary rays. Secondary rays may be embodied as shadow rays, reflection rays, or refracted rays which be generated when a primary ray intersects a scene object or primitive and reflects off of the scene object or primitive, or is refracted, for example. When a primary ray intersects a scene object or primitive, a plurality of secondary rays may be generated, and the plurality of secondary rays may include a combination of different types of secondary rays. The ray generating unit 210 may generate the one or more secondary rays using the stored intersection point. For example, when ray traversal with respect to the one or more primary rays is completed, the ray generating unit 210 may collectively generate the one or more secondary rays by performing ray generation using the intersection point.

In operation 840, the ray tracing unit 220 may process ray tracing with respect to the generated one or more secondary rays.

Figure 9:
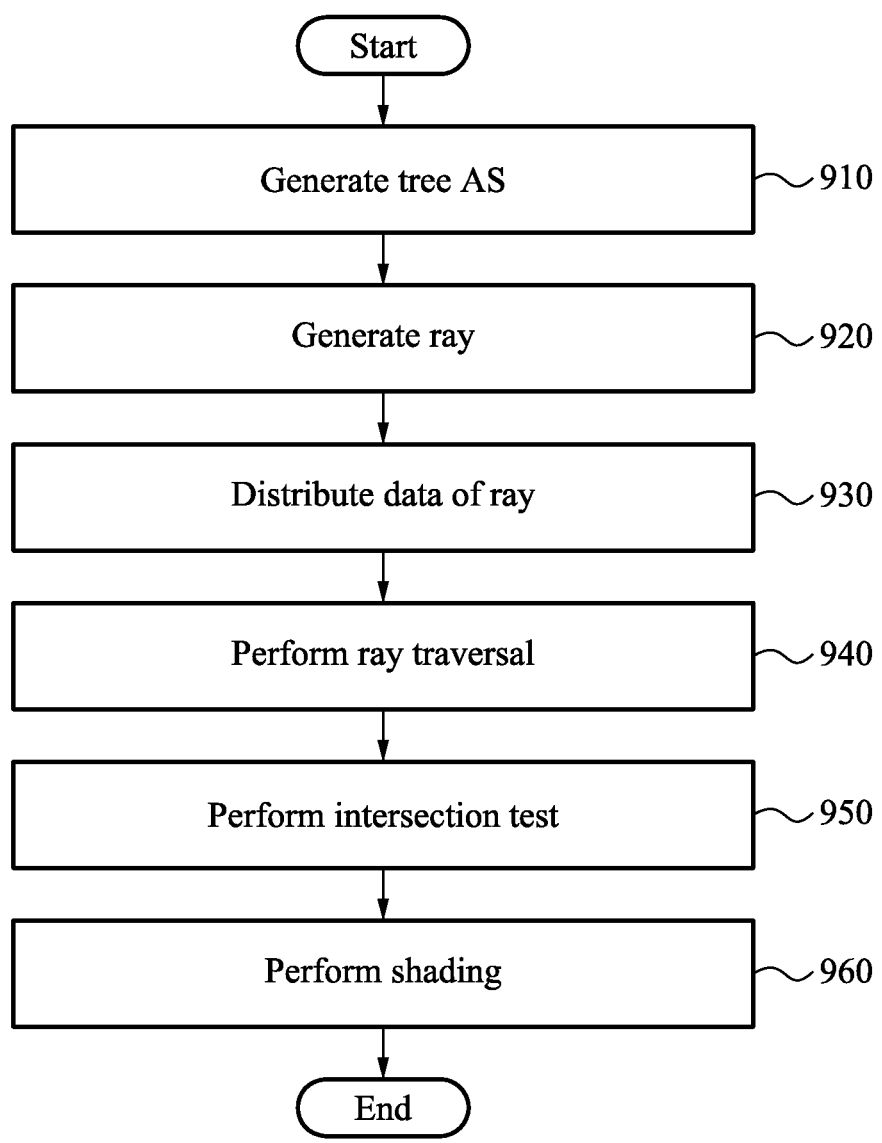
FIG. 9 illustrates a graphics processing method for processing ray tracing according to an embodiment.

FIG. 9 illustrates a graphics processing method for processing ray tracing according to an embodiment.

In operation 910, a GPU may generate a tree AS.

In operation 920, the ray generating unit 210 may generate a ray. Generating of the ray may indicate that data of the ray is generated.

In operation 930, the management unit 230 may distribute data of the ray to a plurality of TRV units. Each of the plurality of TRV units may process ray traversal with respect to a subdivision of the entire space.

A node present within the tree AS used for ray tracing may indicate or correspond to a subdivision within the entire space. Each of the plurality of TRV units may correspond to a sub-tree indicating or corresponding to a subdivision of the entire space. The sub-tree may be a portion of the tree AS used for ray tracing.

The management unit 230 may distribute data of the ray to a TRV unit corresponding to a sub-tree including a node visited by the ray among the plurality of TRV units.

In operation 940, the plurality of TRV units may process traversal of the ray.

In operation 950, one or more IST units may process an intersection test of the ray.

In operation 960, the shading unit 290 may process shading of a pixel corresponding to the ray.

Technical description described above with reference to FIG. 1 through FIG. 8 may be applied to the operations disclosed with respect to FIG. 9, and therefore a further detailed description will be omitted here.

According to exemplary embodiments, ray tracing performance of a GPU may be improved. The above-described example embodiments effectively manage the distribution of data of a ray using a management unit which selectively and dynamically determines how data of a ray is distributed to TRV units. The management unit may determine how data of a ray is distributed to a TRV unit based on information associated with a fit point corresponding to a subdivision of an entire space of an acceleration structure. Fit points may be associated with a sub-tree of an acceleration structure and may be selected based upon a maximum number of geometries associated with a node of a sub-tree. How ray data is distributed may depend on the number of TRV units available relative to the number of fit points. The management unit may generate the one or more fit points based on a capacity of data that may be stored in a cache of a TRV unit. Thus, a higher capacity of a cache for a TRV unit may result in less fit points being required. By distributing the sub-trees among TRV units according to the number of fit points generated, data needed for ray traversal may be effectively stored in a cache of a TRV unit with respect to a sub-tree so that the TRV unit may efficiently perform ray traversal with respect to the sub-tree. Thus, cache efficiency may be improved and latencies avoided since data related to the sub-trees (scene objects and primitives) may not need to be fetched from an external memory.

The apparatus and methods used to perform ray tracing according to the above-described example embodiments may use one or more processors, which may include a graphical processing unit (GPU), microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. The program instructions may be executed by one or more processors. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. A graphics processing apparatus to process ray tracing, the apparatus comprising:
   a plurality of traversal processors configured to process traversal of a ray, each traversal processor including a cache memory; and
   a management processor configured to adaptively partition a ray traversal area into a plurality of subdivisions according to a size of a respectively corresponding traversal processor cache memory and distribute correspondingly subdivided data of the ray to the plurality of traversal processors,
   wherein each of the plurality of traversal processors processes ray traversal with respect to a subdivision of the ray traversal area,
   wherein the management processor is further configured to allocate at least one fit point to a plurality of traversal processors when a number of fit points is less than a number of traversal processors,
   wherein each of the plurality of traversal processors processes ray traversal with respect to an area corresponding to an allocated fit point in a tree acceleration structure used for ray tracing, and
   wherein the area corresponding to the fit point in the tree acceleration structure is a sub-tree of the tree acceleration structure in which a node corresponding to the fit point in the tree acceleration structure is a root node.

2. The apparatus of claim 1, wherein the ray traversal area is a space in which ray tracing is performed.

3. The apparatus of claim 1, wherein a node within a tree acceleration structure used for ray tracing corresponds to the subdivision.

4. The apparatus of claim 1, wherein the subdivision is a bounding box.

5. The apparatus of claim 1, wherein the plurality of traversal processors shares a global stack for traversal of the ray.

6. The apparatus of claim 1, wherein the fit point is determined based on a number of primitives corresponding to one or more leaf nodes of the sub-tree and a number of nodes of the sub-tree.

7. The apparatus of claim 1, wherein:
   the fit point is determined based on a size of data associated with the fit point and a size of the cache of a traversal processor associated with the fit point.

8. The apparatus of claim 1, wherein:
   each of the plurality of traversal processors corresponds to a sub-tree corresponding to the subdivision, and
   the sub-tree is a portion of a tree acceleration structure used for ray tracing.

9. The apparatus of claim 8, wherein the management processor distributes the data of the ray to a traversal processor corresponding to a sub-tree that comprises a node visited by the ray, among the plurality of traversal processors.

10. The apparatus of claim 8, wherein:
    one or more sub-trees are provided, and
    each of the one or more sub-trees does not overlap within the tree acceleration structure.

11. The apparatus of claim 8, wherein:
    one or more sub-trees are provided, and
    data of a ray that visits a node of a first sub-tree not corresponding to the plurality of traversal processors, among the one or more sub-trees, is stored in a queue.

12. The apparatus of claim 11, wherein the management processor allocates a first traversal processor among the plurality of traversal processors to a first sub-tree, and distributes, to the first traversal processor, the stored data of the ray that visits the node of the first sub-tree.

13. The apparatus of claim 8, wherein:
a second sub-tree among the one or more sub-trees corresponds to two or more traversal processors among the plurality of traversal processors, and
the management processor determines a traversal processor to transfer data of a ray that visits a node of the second sub-tree among the two or more traversal processors corresponding to the second sub-tree, based on load balancing.

14. The apparatus of claim 1, further comprising:
one or more intersection test processors to process an intersection test of the ray,
wherein the ray is a ray that is traversed within a tree acceleration structure by the plurality of ray traversal processors.

15. The apparatus of claim 14, wherein:
an intersection point generated through the intersection test is maintained for each of the one or more intersection tests, and
when ray traversal with respect to one or more primary rays is completed, ray generation is performed with respect to the intersection point and one or more secondary rays are generated.

16. A graphics processing method for processing ray tracing, the method comprising:
adaptively partitioning a ray traversal area into a plurality of subdivisions according to a size of a corresponding traversal processor cache memory;
distributing correspondingly subdivided data of a ray to a plurality of traversal processors; and
processing, by the plurality of traversal processors, traversal of the ray,
wherein each of the plurality of traversal processors processes ray traversal with respect to a subdivision of the ray traversal area,
wherein the distributing comprises allocating at least one fit point to a plurality of traversal processors when a number of fit points is less than a number of traversal processors,
wherein each of the plurality of traversal processors processes ray traversal with respect to an area corresponding to an allocated fit point in a tree acceleration structure used for ray tracing, and
wherein the area corresponding to the fit point in the tree acceleration structure is a sub-tree of the tree acceleration structure in which a node corresponding to the fit point in the tree acceleration structure is a root node.

17. The method of claim 16, wherein a node within a tree acceleration structure used for ray tracing corresponds to the subdivision.

18. A non-transitory computer-readable medium comprising a program for instructing a computer to perform the method of claim 16.

19. The method of claim 16, wherein the adaptively partitioning of the ray traversal area includes determining a first subdivision of data of the ray having substantial coherency, the first subdivision of data corresponding to a first subdivision of the ray traversal area, and selectively distributing the first subdivision of data of the ray to a first traversal processor.

20. The method of claim 16, wherein the adaptively partitioning of the ray traversal area is performed according to size of the traversal processor cache, free capacity of the cache, a number of primitives, and coherency of the ray.

21. An electronic device comprising:
a ray tracing unit comprising
a management controller configured to analyze a tree acceleration structure (AS) corresponding to a ray traversal area including subdivisions thereof, and control transmission of selected subdivisions of the ray traversal area to a respective plurality of traversal processors to process traversal of the ray for the subdivision according to fit points associated with the tree AS, each fit point established to include a number of geometries within a sub-tree of the tree AS according to a size of a corresponding traversal processor cache memory,
wherein the management controller is further configured to allocate at least one fit point to a plurality of traversal processors when a number of fit points is less than a number of traversal processors.

* * * * *